June 5, 1934.                    C. HEDDON                    1,961,970
                             METALLIC FISHING ROD
                    Original Filed Feb. 15, 1933    2 Sheets-Sheet 1
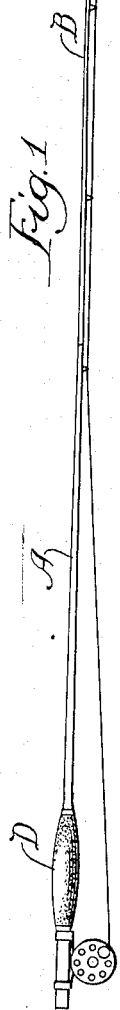
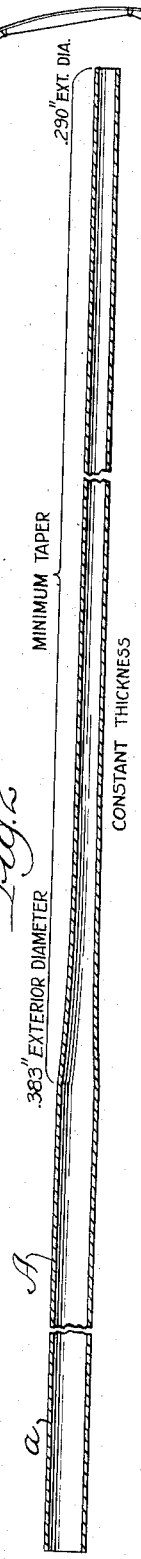
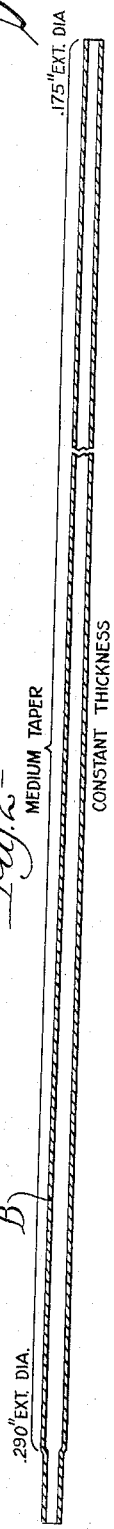
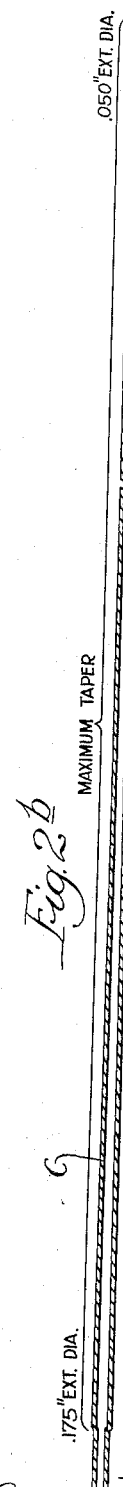
Inventor:
Charles Heddon,
By Banning & Banning
Attys.

June 5, 1934.  C. HEDDON  1,961,970
METALLIC FISHING ROD
Original Filed Feb. 15, 1933   2 Sheets—Sheet 2
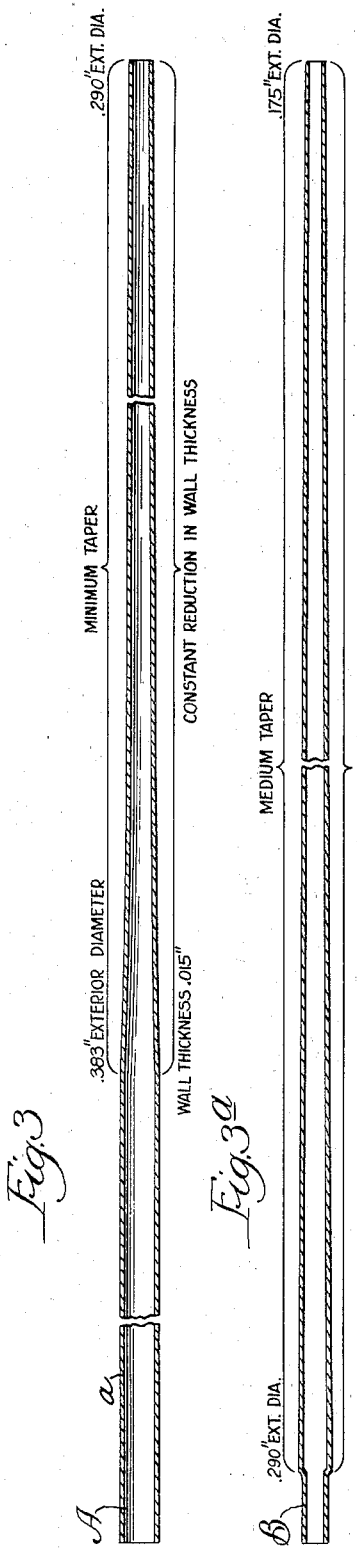
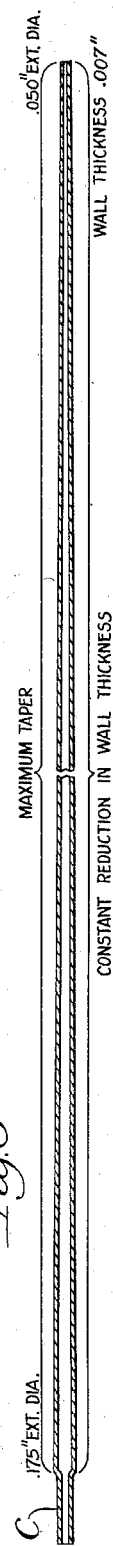
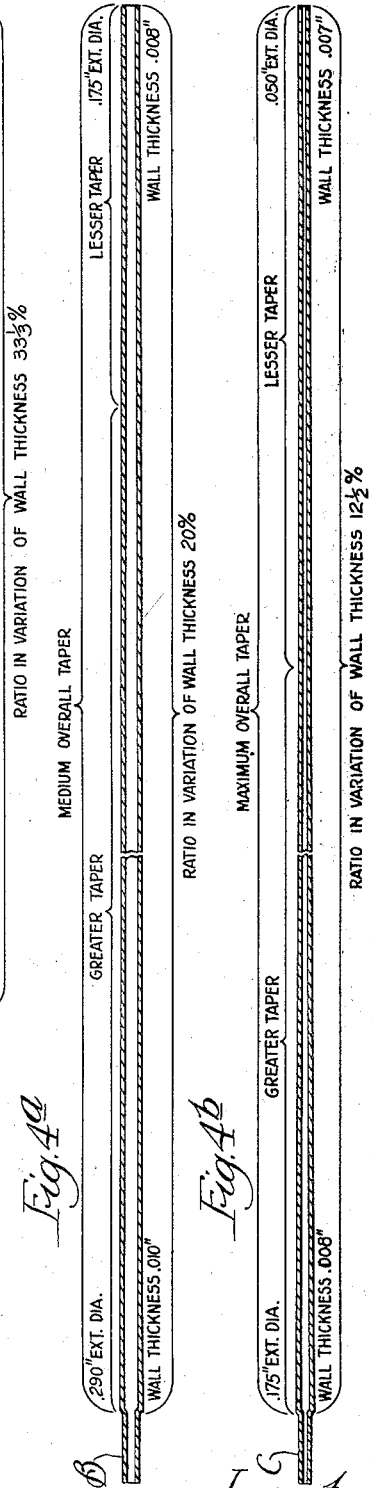
Inventor:
Charles Heddon,
By Banning & Banning
Attys.

Patented June 5, 1934

1,961,970

UNITED STATES PATENT OFFICE 1,961,970

METALLIC FISHING ROD

Charles Heddon, Dowagiac, Mich., assignor to James Heddon's Sons, Dowagiac, Mich., a corporation of Michigan Original application February 15, 1933, Serial No. 656,890. Divided and this application January 12, 1934, Serial No. 706,349

12 Claims. (Cl. 43—18)

This invention is directed to a tubular metallic fishing rod, preferably but not necessarily of drawn seamless steel or other suitable metal, which is so designed as to distribute the weight, flexibility and strength in conformity with requirements which are predetermined with reference to the service for which the rod is intended and with reference to the preferences of individual fishermen in respect to the above characteristics.

In the case of steel rods as now manufactured, the element of strength and durability is frequently present, but adequate strength is often secured at the sacrifice of lightness and a desirable distribution of weight and flexibility throughout various regions in the rod.

The present invention is directed to a proper correlation of the factors of taper and wall thickness, with a view of securing adequate strength, lightness and durability and weight distribution, without sacrifice of other qualities which are present in the finest split bamboo fishing rods as now manufactured.

The present invention is primarily directed to fly rods in which the requirement for lightness and flexibility has heretofore precluded the use of metal as a substitute for split bamboo, but fly rods constructed in accordance with the present invention are found to be equal in all respects to the finest split bamboo fly rods, as regards the matter of lightness and distribution of weight and flexibility and superior thereto in the elements of strength and durability.

In the case of application Serial No. 656,890, of which the present application is a division, the basic feature of construction involved variations in the ratio of wall thickness in different sections of the rod, to which feature the ratio of taper was correlated, but the present invention is directed primarily to certain specified characteristics in the tapering of the rod which constitute the basis or foundation to which the attribute of wall thickness is related as an accessory feature, it being understood that the ratios observed in computing both taper and wall thickness may be employed, either separately in metallic rod construction or in conjunction with one another, and that in the present case attention is directed primarily to the factors involved in a proper tapering of the rod to secure the desired characteristics.

Although the invention is peculiarly adapted to the requirements of a jointed fly rod, the principles to be described are applicable to the construction of bait casting, salt water fishing, or other rods, and although tempered steel is the material commonly employed in constructing the rod, it is not the intention to limit the invention to the use of that metal, since alloys of various metals are available which possess characteristics well adapting them for use in the manufacture of the rod of the present invention.

Further objects and details will appear from a description of the invention, in conjunction with the accompanying drawings, wherein,—

Figure 1 is a side elevation of a jointed fly rod embodying the features of the present invention;

Figs. 2, $2^a$ and $2^b$ are sectional views of the three metallic sections of the rod displaying the principle of differing ratios of variation in taper in a rod in which the wall thickness is maintained constant throughout;

Figs. 3, $3^a$ and $3^b$ are sectional views of the three metallic sections of the rod displaying the principle of differing ratios of variation in taper in a rod in which the wall thickness is progressively reduced toward the tip end in constant ratio;

Figs. 4, $4^a$ and $4^b$ are sectional views of the three metallic sections of the rod displaying the principle of differing ratios of variation in taper in a rod in which the wall thickness is reduced from the butt end toward the tip end in accordance with variable ratios in different sections of the rod.

The rod of the present invention differs essentially from solid steel rods and wooden rods of split bamboo or the like, in that the present rod is constructed of tubing preferably of drawn steel, so that it provides a hole or bore extending throughout the rod, and this circumstance permits of suitable variations both in wall thickness and in external taper and in the combination of these variable factors, with the result that by proper designing and distribution of the elements of external taper and wall thickness throughout various regions in the rod, it is possible to design the rod in such a way as to most advantageously distribute the flexibility, strength and weight to meet the intended requirements and to give to the rod the proper characteristics required by discriminating users of fine fishing rods.

Particularly in the designing of rods for dry fly casting it is essential to afford extreme flexibility throughout the outer third of the rod, combined with adequate strength and stiffness toward the butt end of the rod, and the principles of the present invention enable these results to be attained in the degree necessary to bring the tip into fast motion, causing quick recovery of the entire rod and bringing it back to a stationary position rapidly after delivering the cast.

In the construction of fly rods for wet casting, it is desirable to have the entire rod more limber or supple throughout, and this can be accomplished in accordance with the principles of the present invention by more uniformly distributing the taper throughout the rod and combining a moderately flexible tip section with a butt section which is lighter in comparison and smaller in diameter than in the case of a rod for dry casting.

In the case of bait casting rods, it is desirable ordinarily to afford a greater measure of stiffness in the tip region and lesser flexibility throughout than in the case of fly rods, and likewise the principles of the present invention are applicable to meet such requirements.

Figure 1 shows a fishing rod comprising three sections, A, B, C, which may be conveniently referred to as the butt section, the middle section, and the tip section. The butt section A, as shown, is extended through a handle D of the usual character, and as illustrated the butt section with the handle attached is of uniform length with the middle section B and the tip section C, although it is not the intention to limit the invention to a rod in which the butt section is permanently formed with the handle, since the butt section, exclusive of the handle, might be made of equal length with the remaining two sections.

As shown, the butt section A terminates in a portion $a$ which is of cylindrical formation and relatively short length to receive the handle grip and reel seat, and beyond the portion $a$ the rod, throughout the sections A, B, C, is tapered in accordance with varying ratios in which a minimum degree of taper is present in the section A, a medium degree of taper in the section B, and a maximum degree of taper in the section C, with a constant wall thickness throughout all sections of the rod, in the particular form shown in Fig. 2.

By way of exemplification it may be assumed that the section A beyond the butt portion $a$ is tapered from an exterior diameter of .383 in. at the inner end to a diameter of .290 in. at the outer end, which is a minimum ratio of taper; that the middle section of the rod tapers from an exterior diameter of .290 in. at the inner end to a diameter of .175 in. at the outer end, which is a medium taper; and that the tip section tapers from an exterior diameter of .175 in. at the inner end to an external diameter of .050 in. at the extreme tip end, which is a maximum taper.

In Fig. 3, the same ratios of taper are combined with a constant reduction of wall thickness in conformity with a uniform ratio from end to end of the rod, which by way of illustration may be assumed to vary from a thickness of .015 in. at the butt end to a thickness of .007 in. at the extreme tip end.

In the construction of Fig. 4, the minimum overall taper of the section A is divided into two ratios, the greater ratio being toward the inner end of the section and the lesser ratio being toward the outer end of the section, and the section B of medium taper and the section C of maximum taper are likewise divided, the greater taper in each instance being toward the inner end and the lesser taper being toward the outer end, although it will be understood that if desired the ratio of taper variation may in each section be lesser at the inner end and greater at the outer end, in reversal to that shown in Fig. 4. In fact, the present invention contemplates that the ratio of taper may constantly and progressively vary throughout the rod as a whole, and preferably in such a way as to progressively increase the ratio from the butt end toward the tip end of the rod.

Fig. 4 also displays the characteristic of variations in the ratio of wall thickness conjointly with variations in the ratio of taper, and as shown illustrates a construction in which the ratio of variation in wall thickness in the section A is at a maximum with a medium variation in ratio of wall thickness in the section B, and a minimum variation in ratio of wall thickness in the section C. Thus Fig. 4 displays a construction in which the ratio of variation in taper increases from the butt end of the rod toward the tip end, with a concurrent decrease in the variation of ratio in wall thickness in the same direction, which is a preferable form of construction for fly rods in which extreme tip lightness and flexibility are desired, as for instance in the case of rods designed for dry fly casting.

Fig. 3 shows a typical form of construction in which the flexibility of the rod will vary throughout in conformity with a variable factor of taper, and the weight and strength will vary throughout in conformity with a constant, or substantially constant, ratio of reduction in wall thickness, giving to the rod extreme lightness as well as flexibility in the tip region.

From the above description it will be apparent that the present invention contemplates numerous variations in the ratio of taper which may be variously combined if desired, with variations in the ratio of wall thickness in order to secure the desired distribution of flexibility, weight and strength, to meet the requirements of different forms of fishing or the individual preferences of discriminating fishermen.

Although the description given herewith has reference particularly to the separable sections of a jointed rod, it will be understood that the features of the present invention are applicable to single piece rods, and that the term "section" is intended to refer not only to separable sections but also to the corresponding portions of a one-piece rod.

A rod properly designed in conformity with the principles of the present invention will therefore possess the best characteristics of a high grade split bamboo rod combined with the best characteristics of steel rods as heretofore constructed, and these results may if desired be attained in rods of lesser weight than it has heretofore been possible to secure in high grade fishing rods.

I claim:

1. A tubular exteriorly tapered metallic fishing rod characterized by the fact that the ratio of exterior tapering differs in different portions of the rod.

2. A tubular exteriorly tapered metallic fishing rod characterized by the fact that the ratio of exterior tapering differs in different portions of the rod, the ratio of exterior tapering being lesser in the region toward the butt end of the rod and greater in the region toward the tip end of the rod.

3. A tubular exteriorly tapered metallic fishing rod characterized by the fact that the ratio of exterior tapering differs in different portions of the rod, the ratio of tapering being at a minimum toward the butt end of the rod, and at a medium ratio in the intermediate portion of the rod, and at a maximum in the portion terminating at the tip end of the rod.

4. A fishing rod made of tubular metallic separable sections, a plurality of which are exteriorly tapered and wherein the degree of taper of said tapered sections differs in the different sections.

5. A fishing rod made of tubular metallic separable sections, at least one of which is exteriorly tapered, and in which the degree of taper differs within different portions of the same section.

6. A drawn tubular tapered metallic fishing rod characterized by the fact that the ratio of tapering differs in different portions of the rod.

7. A fishing rod made of tubular metallic separable sections, a plurality of which are exteriorly tapered and wherein the degree of taper of said sections differs in the different sections, and wherein the wall thickness of the tapered sections remains constant.

8. A fishing rod made of tubular metallic separable sections, a plurality of which are exteriorly tapered, and wherein the degree of taper of said sections differs in the different sections, and wherein the wall thickness of the tapered sections decreases from the butt end of the rod toward the tip end thereof.

9. A tubular exteriorly tapered metallic fishing rod characterized by the fact that the ratio of exterior tapering differs in different portions of the rod, and wherein the wall thickness throughout remains constant.

10. A tubular exteriorly tapered metallic fishing rod characterized by the fact that the ratio of exterior tapering differs in different portions of the rod, and wherein the wall thickness decreases from the butt end of the rod toward the tip end thereof.

11. A tubular exteriorly tapered metallic fishing rod characterized by the fact that the ratio of exterior tapering differs in different portions of the rod, the ratio of exterior tapering being lesser in the region toward the butt end of the rod and greater in the region toward the tip end of the rod, and wherein the wall thickness of the rod remains constant.

12. A tubular exteriorly tapered metallic fishing rod characterized by the fact that the ratio of exterior tapering differs in different portions of the rod, the ratio of exterior tapering being lesser in the region toward the butt end of the rod and greater in the region toward the tip end of the rod, and wherein the wall thickness decreases from the butt end of the rod toward the tip end thereof.

CHARLES HEDDON.